3,267,061
FREEZE-THAW STABLE STYRENE BUTADIENE MALEIC ACID INTERPOLYMER LATEX AND PAINTS
George A. Senior, Jr., Bloomfield, and William I. Wertz, East Brunswick, N.J., assignors to Union Carbide Corporation, a corporation of New York
No Drawing. Filed June 18, 1962, Ser. No. 202,961
12 Claims. (Cl. 260—29.7)

This application is a continuation-in-part of our earlier application Serial No. 545,786, filed November 8, 1955, now abandoned.

This invention relates to novel, stable, water emulsions and to paints made therefrom, as well as to a novel process for preparing such compositions.

More especially, our present invention deals with novel compositions stable to alternate freezing and thawing, said compositions comprising an aqueous dispersion of a copolymer of a vinyl aromatic compound and an aliphatic conjugated diolefin, the copolymer being at least partially formed in the presence of a minor amount of maleic acid or maleic anhydride, or both.

It is well-known that paints prepared from aqueous resin dispersions have come into extensive use in recent years. The ease with which such paints can be applied, even by the inexpert, as well as the ease with which drippings and spillage of such paints can be cleaned, along with other advantages inherent in such paints, have contributed to their present wide-spread popularity.

However, paints of the type mentioned do have a serious disadvantage which mitigates against their even wider use and which causes dissatisfaction and economic loss in many instances. Reference is made to the fact that such paints are not stable when subjected to storage at low temperatures. This instability arises from the fact that the paints, being based on water emulsions, freeze at temperatures under 0° C., such freezing generally causing the emulsions to break, and after such previously frozen paints are thawed, as by heating or by a rise in temperature of the surroundings, the paints are not usable normally for there results a non-uniform coagulated composition unsuitable for use as a coating material.

Accordingly, it is an object of this invention to provide water emulsions and paints which possess the aforementioned advantageous properties, but which at the same time do not possess the aforementioned disadvantageous property.

In a specific sense, it is an object here to provide compositions of the type noted which are stable to alternate freezing and thawing, i.e., which can be repeatedly frozen and thawed without material adverse effect on the usefulness of the compositions for coating purposes.

A further object of the present invention is to provide a novel process for making freeze-and-thaw-stable compositions of the kind described.

The foregoing and other objects have been attained by providing novel water emulsions and paints containing such emulsions prepared by copolymerizing in an aqueous emulsion a vinyl aromatic compound and an aliphatic conjugated diolefin in the presence of a minor amount of maleic acid or maleic anhydride, or both, as aforesaid.

The use of aqueous dispersions of copolymers of vinyl aromatic compounds, such as styrene or vinyl toluene and aliphatic conjugated diolefins, such as butadiene or isoprene in paints is known. Such dispersions are prepared by polymerizing a mixture of the monomers in an aqueous emulsion in accordance with known procedures. Usually these procedures involve mixing the two monomers in the relative proportions corresponding to the desired composition of the copolymer, adding a suitable emulsifying agent, and agitating the mixture to effect emulsification. Polymerization catalysts may also be added along with other special reagents to control particle size and rate of reaction. Emulsions thus prepared can be used for the preparation of paints by the addition of pigments, fillers, thickening agents, protective colloids and the like. Such paints can be applied by either brushing, dipping, spraying or roller coating and then air dried or baked to smooth uniform films.

In carrying out our process for preparing our novel compositions we follow in general the known procedures for copolymerizing the indicated monomers. However, we conduct the polymerization, or at least part thereof, in the presence of maleic acid or maleic anhydride, or both.

We have found that the most satisfactory emulsions result when the maleic acid or anhydride is added after at least about 20 weight percent of the monomers have been converted to copolymer. It is preferred to make this addition after from about 40 to about 80 percent of the monomers have been copolymerized. If the maleic acid or maleic anhydride is added at the beginning of the copolymerization the compositions obtained possess desirable properties but the reaction rate is greatly retarded. If the maleic acid or anhydride is added after more than about 80 percent of the mixture of monomers has copolymerized, the maleic acid or anhydride tends to separate out in the films made from the resulting compositions. We have, however, corrected this tendency to separate by continuing the reaction beyond the point of complete copolymerization of the monomers.

The extent to which copolymerization has occurred is determined by taking a weighed sample of the reaction mixture, evaporating off the water and unreacted monomers and weighing the residue. The weighed residue divided by the original weight of the monomers and the nonvolatile ingredients in the sample gives the percent polymerization.

While we describe herein our method and compositions as most desirably applied to styrene and butadiene, it will be understood that other known copolymerizable monomers of the classes noted may be used in accordance with our invention. For example, the vinyl aromatic hydrocarbon should be one having one vinyl group attached to an aromatic ring and containing from 8 to 9, inclusive, carbon atoms, i.e., styrene or vinyl toluene, and the aliphatic conjugated diolefin should be a four-carbon chain conjugated diolefin having from 4 to 5, inclusive, carbon atoms, i.e., butadiene, or isoprene.

It is to be understood that the relative proportions of the vinyl aromatic monomer and the aliphatic conjugated diolefin monomer may vary over very wide limits. For coating compositions we prefer to employ from about 60 to about 70 mole percent of the vinyl monomer to about 30 to about 40 mole percent of the conjugated diolefin.

The amount of emulsifying agents used in preparing these latices can also vary widely, but it usually is about 1.0 to 6.0 percent of the total amount of the polymerizable monomers. If desired, two different types of emulsifying agents can be used, e.g., an ionic type to initiate the emulsification of the monomers, and a nonionic type to maintain the copolymer in emulsified form. One part of ionic emulsifier to 2 to 6 parts of nonionic emulsifier is the usual proportion in which these may be used. However, the particular emulsifying agents employed in this invention are not critical and any of those conventionally employed in the latex art can be employed herein.

The polymerization catalyst is usually a free radical or oxidation catalyst such as a peroxide or redox system and is employed in amounts of 0.1 to 2.5 percent of the weight of the mixture of monomers. However, the catalyst as with the emulsifying agent is not critical in this invention as long as the monomers are polymerized and a stable emulsion is thereby secured.

We have found that while the amount of the maleic acid or anhydride can vary widely, small amounts give satisfactory results and larger amounts do not result in any particular added benefits. In practice, therefore, we prefer to employ amounts between about 1 and about 3 percent by weight of the mixture of monomers. Lower amounts are not sufficiently effective for most practical purposes in imparting the required freeze-thaw stability. An excess of maleic acid or anhydride renders the emulsion quite acid, requiring additional alkali for neutralization purposes, as hereinafter set forth.

Other ingredients conventional in the latex field may be added to the reaction mixture to cause effects already known to be manifested by such additives. For example, salts such as potassium chloride to control the particle size, acrylic acid to control stability of the latex and prevent graininess of coatings and films made from the latex, and mercaptans such as lauryl and tertiary dodecyl mercaptan to control cross linking. Protective colloids and thickening agents such as polyvinyl alcohol, cellulose ethers and the like may be added if desired. These optional ingredients are usually added in amounts of about 0.1 to 1.0% of the weight of the reaction product.

It is highly critical in this invention that the pH of the latex after polymerization is completed be adjusted to a value greater than 7 with a monofunctional base. Freeze-thaw stability is not secured unless this neutralization is accomplished. During the polymerization and after the addition of the maleic acid or maleic anhydride, the pH of the emulsion is quite low, generally about 1 to 2, and depending on the amount of maleic acid present. These acid groups become bound into the polymer latex and unless neutralized, remain active for subsequent reaction. This is highly detrimental to the stability of the latex and cannot be tolerated.

In the neutralization, it is essential that the neutralizing base be monofunctional, i.e., has only one free hydroxyl group available for neutralizing the acid groups in the polymer latex. Any polyfunctional base will cross-link polymer molecules and precipitate or coagulate the latex. Thus, agents such as the alkaline earth metal hydroxides and oxides of calcium, barium, etc., cannot be used, nor can polyvalent metal oxides such as zinc oxide and hydroxide, ferric hydroxide and other similar basic hydroxides.

Preferably, monofunctional bases such as ammonia and ammonium hydroxide and alkali metal hydroxides such as sodium or potassium hydroxide are used, and the pH adjusted to a value of between about 8 to 10 although, if desired, it is possible to adjust the pH to as high as 12 or more although no additional benefit is thereby secured. In cases of alkali-sensitive additives, such as pigments, fillers, colorants or dyes, such high pH values may even be undesirable and desirable operation at a pH of about 8 may be preferred.

After this neutralization, the latex is stable to freezing and thawing for many cycles without detrimental effects. Also, it is possible to add any normally inert paint additive or pigment, i.e., a colorant, or dye to the latex to secure desired coloring or special effects.

The following procedure describes our novel process in general:

About forty parts of a mixture of 70-40 mole percent of styrene and 30-60 mole percent of butadiene under pressure or at a temperature low enough to liquify the butadiene are mixed with about sixty parts of water along with a suitable emulsifying agent such as a blend of an alkyl aryl sulfonate and alkyl aryl polyether alcohol and a polymerization catalyst such as potassium persulfate. The mixture is agitated to effect emulsification and then reacted under pressure at a temperature of about 50-70° C. and at a pH above 7 and about 8-12 until about forty percent by weight of the monomers have been converted to copolymer. An amount up to 3 percent by weight of the monomers mixture of maleic acid or anhydride or mixture thereof in aqueous solution is added to the reaction mixture which reduces the pH to about 2 and copolymerization is continued until complete as indicated by the decrease in vapor pressure resulting principally from the consumption of the butadiene. The time required for complete reaction is about 10 to 24 hours. The reaction mixture is concentrated in vacuo to about 50% solids content and an alkali such as ammonium hydroxide is added to adjust the pH to about 8-10 along with a thickening agent such as potassium polyacrylate, if desired.

The resulting product has excellent stability at low temperatures and will withstand as many as 5-10 cycles of freezing and thawing without materially affecting its usefulness in the preparation of coating compositions.

In order to illustrate our invention more fully but without thereby limiting it, the following detailed examples are given. All parts given herein are by weight.

EXAMPLE I

*Preparation of latex*

(a) A mixture of 25.8 parts of styrene and 13.90 parts of butadiene cooled to a temperature at which the butadiene is liquid, i.e., −50° C., was added to 50 parts of water along with 0.3 part of an anionic alkyl aryl sulfonate emulsifier, (Nacconol NRSF, National Aniline Div., Allied Chem. & Dye Corp.) 2.0 parts of a nonionic alkyl aryl polyether alcohol emulsifier (Triton X-100, Rohm & Haas), 0.12 part of potassium persulfate as polymerization catalyst, 0.10 part of potassium hydroxide, 0.09 part potassium chloride, 0.08 part lauryl mercaptan and 0.04 part tert. dodecyl mercaptan.

The aqueous mixture was agitated to form an emulsion and this was heated at a temperautre of 70° C. until 40% copolymerization had taken place as evidenced by sampling and testing as above described.

A solution of 0.5 part maleic anhydride in 0.75 part of warm water (50° C.) was then added and heating was continued until copolymerization was complete, i.e., for a period of about 20 hours. The final reaction product was then concentrated to a solids content of about 50% at reduced pressure, 90 mm. of Hg., and then adjusted to a pH of about 8 by the addition of ammonium hydroxide.

The resulting product was then tested for freeze-thaw stability as follows:

A fifty gram sample was placed in a refrigerator at a temperature of −20° C. and held at that temperature for sixteen hours, removed and allowed to thaw to room temperature (25° C.). This was repeated four times and the final thawed latex had substantially the same viscosity as the original latex and there was no evidence of coagulation.

(b) A latex having the same solids concentration was prepared by a procedure similar to that described in (a) but omitting the addition of maleic anhydride. When this product was subjected to the same freeze-thaw test as described in (a) it coagulated to a rubbery mass during the first cycle and when thawed to room temperature it could not be redispersed by mixing.

EXAMPLE II

*Preparation of latex paint*

(a) A pigment paste was first prepared using the following ingredients and amounts:

Water _____ 433
Titanium dioxide[1] _____ 750
Lithopone[2] _____ 200
Silicate[3] _____ 50
Ammonium Caseinate[4] _____ 100
Potassium polycarylate (15% solids)[5] _____ 100

[1] Ti-Pure R-110, E. I. du Pont de Nemours & Co.
[2] Albalith No. 11, N.J. Zinc Co.
[3] ASP-100, aluminum silicate, Minerals & Chemicals Corp. of America.
[4] Aqueous solution, 22% solids.
[5] GOODRITE K-780, B. F. Goodrich Chemical Co.

The above materials were mixed to a paste and then were given one pass through a three roll paint mill to obtain a smooth consistent paste. 500 parts by weight of this pigment paste and 125 parts by weight of water were then stirred into 200 parts by weight of a latex prepared as described in Example I(a).

A sample of the paint thus prepared was subjected to five cycles of freeze-thaw tests as described in Example I(a), and at the end of each cycle could be redispersed by simple mixing to restore it to its original consistency.

(b) A pair similar to that described in part (a) of this example was prepared but using the latex described in Example I(b). When this paint was subjected to the freeze-thaw test it coagulated during the first cycle and could not be redispersed.

EXAMPLE III

*Comparison of neutralized latices*

840 grams of latex was prepared as described in Example I except that the final step of adjustment of the pH to 8 was omitted. The latex at this point had a pH of 1.85 and a nonvolatiles content of 41.2 percent which corresponds to 98.2 percent conversion of the monomers. The Brookfield viscosity of the latex was 23 centipoises as measured on a Model RVT Brookfield viscometer using the No. 1 spindle at 100 r.p.m. The latex was then stripped of any unreacted monomers and concentrated under vacuum to 50.6 percent nonvolatiles. The stripped latex had a pH of 2.0 and Brookfield viscosity of 41 cps., measured as before. Three portions of the latex were then treated as follows:

(a) 100 grams of the stripped latex was adjusted from pH 2.0 to 9.4 with 0.61 gram of calcium hydroxide [$Ca(OH)_2$]. The sample was then subjected to one freeze-thaw cycle and the Brookfield viscosity had increased to 260 centipoises, indicating a substantial degree of cross-linking had taken place; on the second freezing, the latex coagulated into a solid gelled mass and could not be made fluid upon thawing.

(b) 100 grams of the stripped latex was adjusted from pH 2.0 to 6.3 with 0.65 gram of zinc oxide (ZnO). More zinc oxide (a total of 4.0 grams) raised the pH to only 6.35. This sample did not pass one freeze-thaw cycle, i.e., it formed a solid gelled mass on freezing that could not be made fluid again after thawing.

These two sample experiments demonstrate that polyfunctional bases (i.e., divalent metal oxides and hydroxides) cannot be used to neutralize the latices of this invention. However, in comparison with sample (c), the divalent metal oxides or hydroxides can be added after neutralizing with the monofunctional base.

(c) 100 grams of the stripped latex was adjusted from pH 2.0 to 9.0 with 2.89 grams of 28% ammonia, then treated with 0.61 gram of calcium hydroxide, the same amount used in sample (a). The final pH of the latex was 10.3. This sample after one freeze-thaw cycle, had a Brookfield viscosity of only 80 cps., indicating only a slight change in fluidity. It was still quite fluid after two freeze-thaw cycles.

EXAMPLE IV

*Preparation of latex and film*

The following materials were charged to each of four 300 ml. Pyrex pressure bottles which had been thoroughly purged with nitrogen.

| Reagent: | Grams |
| --- | --- |
| Water, distilled | 120.4 |
| Nacconol NRSF (92% active) | 0.71 |
| Potassium persulfate | 0.255 |
| Potassium chloride | 0.187 |
| Triton X-100 | 2.97 |
| Acrylic acid, distilled | 0.212 |
| Styrene, inhibitor removed | 56.8 |
| n-/t- dodecyl mercaptans (2/1) | 0.34 |
| Butadiene | 28.2 |

The bottles were capped with polyethylene lined "Crown" caps and placed in a 60° C. thermostated bath containing a cylindrical metal basket, capable of holding 8 bottles, rotating at 43 r.p.m. The bottles were heated for 4.5 hours in the rotary bath, removed, cooled, and sampled. Total solids determinations for each of the bottles showed an average monomer conversion of 70.6 percent. Each of the bottles was then charged with 1.27 grams of maleic anhydride (8.5 grams of a 15 percent solution in water), recapped and returned to the bath for 17.5 hours. At the end of the reaction cycle, the bottles were removed from the bath, cooled, and total solids determination showed an average uniform conversion of 96 percent. The latices from the four bottles were combined, treated with 5.1 grams (1.5 percent based on monomers charge) of nonionic emulsifier (Rohm and Haas, Triton X–100) and adjusted from a pH of 1.9 to a final pH above about 7.0 with 28.15 ml. of 20% potassium hydroxide. The composite latex was then treated with 0.1 percent based on total solids, of an antifoam agent (Nopco Co.'s Antifoam 1407) and stripped to about 50 percent non-volatiles (NV) in laboratory equipment under reduced pressure. The stripped latex was adjusted from a pH of 7.1 to a pH of 10.0 with 3.65 ml. of 20% potassium hydroxide. The latex then had a NV content of 49.7 percent and was diluted to 48.0 percent with 12.4 grams of methanol (4% on NV content) and 9.6 grams of water.

The final latex had the following properties:

| | |
| --- | --- |
| pH, final | 10.0 |
| Percent NV, final | 48.0 |
| Brookfield viscosity, (model RVT, #1 spindle/ 100 r.p.m.), cps. | 55 |
| Mechanical stability, minutes | 60 |
| Particle size, microns (uniform) | .14–.23 |
| Gel content, percent | 77.9 |

Films were drawn on a glass plate with a 0.003 inch draw down blade and the latex film dried. The coatings were very tough, very clear and smooth and only a few grain particles were observed.

The latex was put through 10 free-thaw cycles without substantial changes and no coagulation or precipitation was evident after the 10 cycles.

While we have described our invention in detail in its preferred embodiment, it will be obvious to those skilled in the art, after understanding our invention, that various changes and modifications may be made therein without departing from the spirit or scope thereof. We aim in the appended claims to cover all such modifications and changes.

We claim:

1. The process for making coating compositions comprising aqueous dispersions stable to alternating freezing and thawing, which comprises copolymerizing in an aqueous emulsion, a mixture of monomers comprising (a) a vinyl aromatic compound having one vinyl group attached to an aromatic ring and containing from 8 to 9, inclusive, carbon atoms, (b) a 4-carbon chain conjugated diolefin hydrocarbon having from 4 to 5 inclusive, carbon atoms, adding to said mixture at a point during the copolymerization, at least 1 percent by weight of the mixture of monomers of at least one acidic member selected from the group consisting of maleic acid and maleic anhydride, continuing the polymerization in the presence of said acidic member to form an interpolymer of said acidic member, said vinyl aromatic compound and said conjugating diolefin wherein the vinyl aromatic compound is combined in an amount between 40 and 70 mole percent in the polymer and thereafter adjusting the pH of the resulting emulsion to a pH greater than 7 with a monofunctional base.

2. The freeze-thaw stable aqueous latex made in accordance with claim 1.

3. The process for making coating compositions comprising aqueous dispersions stable to alternating freezing and thawing, which comprises copolymerizing in an aqueous emulsion, a mixture of monomers comprising (a) styrene and (b) butadiene, adding to said mixture after at least 20 percent by weight and before more than 80 percent by weight of said monomers have copolymerized, a small amount of at least one acidic member selected from the group consisting of maleic acid and maleic anhydride in an amount of at least 1 percent by weight of the mixture of monomers and sufficient to impart freeze-thaw stability to the dispersion, continuing the polymerization in the presence of said acidic member to form an interpolymer of said acidic member, styrene and butadiene wherein the styrene is combined in an amount between 40 and 70 mole percent in the polymer and thereafter adjusting the pH of the resulting emulsion to a pH greater than 7 with a monofunctional base.

4. The freeze-thaw stable aqueous latex made in accordance with claim 3.

5. The process according to claim 3 wherein the styrene is present in an amount between 40 and 70 mole percent in the mixture of monomers, and the amount of said acidic member being from about 1 to 3 percent by weight of the mixture of monomers.

6. The product made in accordance with claim 5.

7. The process according to claim 5 wherein the pH of the resulting emulsion is adjusted to a pH between about 8 to 10.

8. A paint composition stable to alternating freezing and thawing, which compirses in admixture, at least one paint pigment and an aqueous emulsion of a copolymer of (a) a vinyl aromatic compound having one vinyl group attached to an aromatic ring and containing from 8 to 9, inclusive, carbon atoms and (b) a 4-carbon chain conjugated diolefin hydrocarbon having from 4 to 5 inclusive, carbon atoms, said copolymer being formed by copolymerizing said mixture of monomers, adding to said mixture at a point during copolymerization at least 1 percent by weight of the mixture of monomers of at least one acidic member selected from the group consisting of maleic acid and maleic anhydride, continuing the polymerization in the presence of said acidic member to form an interpolymer of said acidic member, said vinyl aromatic compound and said conjugating diolefin wherein the vinyl aromatic compound is combined in an amount between 40 and 70 mole percent in the polymer and thereafter adjusting the pH of the resulting emulsion to a pH greater than 7 with a monofunctional base.

9. A paint composition as described in claim 8 wherein the vinyl aromatic compound is styrene.

10. A paint composition as described in claim 9 wherein the conjugated diolefin is butadiene.

11. A paint composition as described in claim 10 wherein the styrene monomer is present in an amount between about 40 to 70 mole percent, in the mixture of monomers and the amount of the said acidic member being about 1 to 3 percent by weight of the mixture of monomers.

12. A paint composition as described in claim 11 wherein the pH of the said emulsion is adjusted to a pH between 8 and 10.

References Cited by the Examiner

UNITED STATES PATENTS

| | | | |
|---|---|---|---|
| 2,710,292 | 6/1955 | Brown | 260—83.3 |
| 2,724,707 | 11/1955 | Brown | 260—80.7 |
| 2,868,754 | 1/1959 | Eilbeck et al. | 260—29.7 |

MURRAY TILLMAN, *Primary Examiner.*

JAMES A. SEIDLECK, *Examiner.*

J. ZIEGLER, *Assistant Examiner.*